O. D. BARRETT.
Revolving-Harrow.
No. 2,780.
Reissued Oct. 15, 1867.
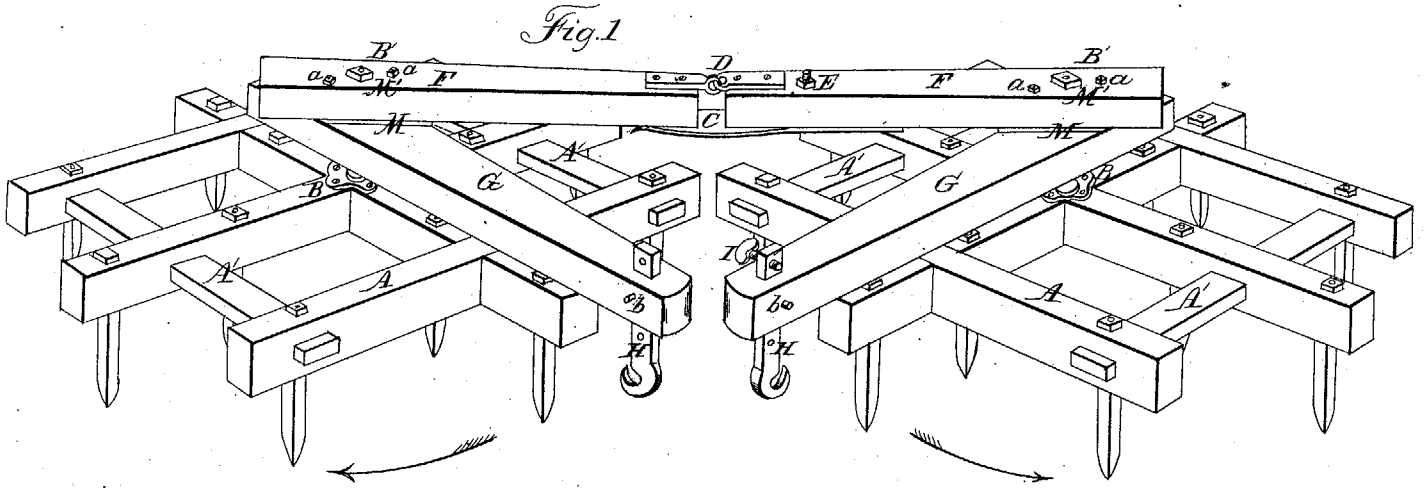
N. PETERS, PHOTO-LITHOGRAPHER, WASHINGTON, D. C.

UNITED STATES PATENT OFFICE.

OLIVER D. BARRETT, OF CLEVELAND, OHIO.

IMPROVEMENT IN ROTARY HARROWS.

Specification forming part of Letters Patent No. 25,620, dated October 4, 1859; Reissue No. 2,780, dated October 15, 1867.

*To all whom it may concern:*

Be it known that I, O. D. BARRETT, of Cleveland, in the county of Cuyahoga and State of Ohio, have invented a new and useful Improvement in Harrows; and I do hereby declare that the following is a full and exact description thereof, reference being had to the accompanying drawing, and to the letters of reference thereon, making a part of this specification.

The drawing is a perspective view of my improvement, and shows the toothed frames A A, made of three pieces of timber, placed parallel to each other at equal distances apart, and halved into another piece at right angles to them at their centers, and so cut off as to their ends that teeth placed in them at proper distances from the ends will be equidistant from each other. The frames may be strengthened by inserting through the three parallel timbers slats A′ A′, one on each side of the center, timber halved into the other three. In case more teeth are desired, in place of the slats A′ A′, timbers like the rest may be halved into the first three and cut off, as to their ends, as the rest described above. The center pins, B B′ B B′, are made fast to the toothed frames A A. The thimbles *m m′ m m′* are made like pipe-boxes, and have flanges at *m m* in their centers, which come between the draft-bars G G and the jointed arms F F. The draft-bars G G and the jointed arms F F are fastened firmly together on the thimbles *m m′ m m′* by the bolts *a a a a* passing through the draft-bars, flanges on the thimbles, and the jointed arms. A hook-and-eye joint, D, connects the two arms F F. A spring, C, is placed under the two arms at their junction, and is made adjustable by the screw E. The draft-hooks H H, inserted in the ends of the draft-bars G G, may be raised or lowered, at pleasure, by means of the pins *b b*, or they may be reversed and inserted from the upper side of the draft-bars, so that the hooks will be above instead of below them. In case these hooks H H be placed below the draft-bars, the draft will cause the jointed arms to raise at D, and the sides of the harrows adjacent to each other to run lighter in the soil than the opposite sides, in which case they will revolve in the direction indicated in the drawing by the arrows. They can be made to rotate in the opposite direction by placing the hooks above the draft-bars, so that they will be above the plane passing through the joint D parallel to the line of draft. By means of the joint D all the desirable qualities of the common jointed harrow are secured to the rotating harrow. By it the harrow adapts itself to the unevenness of the ground, and either of the harrows can be turned over on the other. By fastening the harrows in this position by means of the draft-hooks H H and the thumb-screw I, and tipping them up on their sides with the joint D on the upper side, the harrow becomes a kind of cart, and can be drawn as such from field to field at pleasure. Loosening the spring C and lowering the hooks H H, or raising when reversed, as above described, increases the tendency of the harrows to rotate. These must be varied according to the nature and unevenness of the soil.

What I claim as my invention, and desire to secure by Letters Patent, is—

Causing two harrows, jointed together, to rotate in opposite directions by attaching the draft either above or below the plane passing through the joint D parallel to the line of draft, substantially as specified.

O. D. BARRETT.

Witnesses:
WM. HUTCHINSON,
C. HICKOX.